A. ACKER.
Spring Hinges.
No. 5,932. Reissued June 23, 1874.
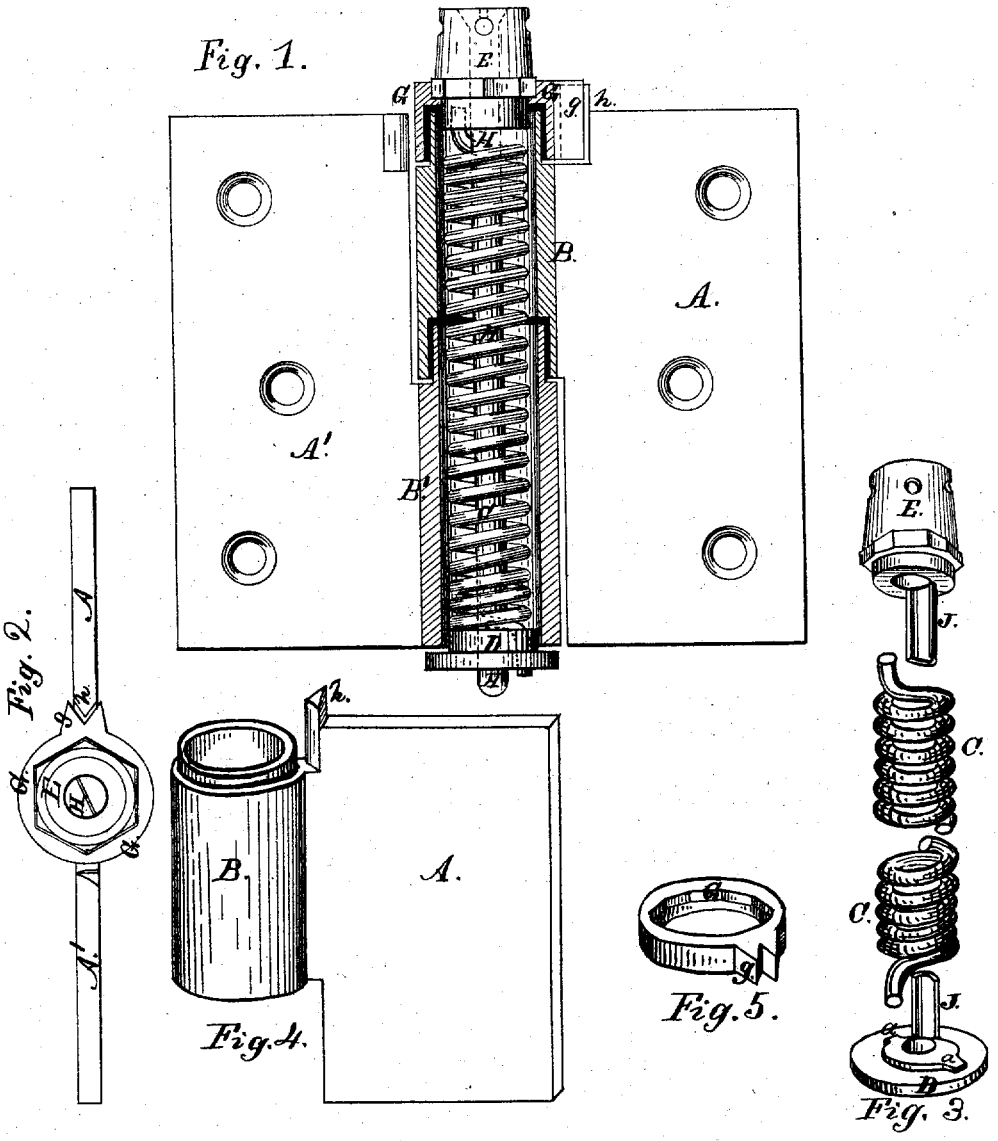
Witnesses:
A. E. Sommers
Thos. Houghton.
Inventor:
Abram Acker.
by his atty
James A. Shilton.
AM. PHOTO-LITHOGRAPHIC Co. N. Y. (OSBORNE'S PROCESS.)

UNITED STATES PATENT OFFICE.

ABRAM ACKER, OF PATERSON, NEW JERSEY, ASSIGNOR, BY MESNE ASSIGNMENTS, TO THE AMERICAN SPIRAL-SPRING BUTT-HINGE MANUFACTURING COMPANY, OF MAMARONECK, NEW YORK.

IMPROVEMENT IN SPRING-HINGES.

Specification forming part of Letters Patent No. 29,212, dated July 17, 1860; reissue No. 5,932, dated June 23, 1874; application filed June 1, 1874.

*To all whom it may concern:*

Be it known that I, ABRAM ACKER, of Paterson, in the county of Passaic and State of New Jersey, have invented an Improvement in Spring-Hinge or Butt, of which the following is a specification:

The object of my invention is set forth in the claims annexed to this specification.

Figure 1 represents a diametrical section through the eyes of the hinge, showing the parts contained therein and the connection of the spring with the head and foot caps. Fig. 2 is a top view of a complete hinge. Fig. 3 shows the helical spring and the head and foot caps in detail. Fig. 4 is a perspective view of one of the leaves and eye of the hinge, and that portion to which the head-cap is attached by a peculiar-shaped ring, shown in Fig. 5 in a perspective view.

Similar letters of reference indicate corresponding parts in all the figures.

This invention is an improvement in that class of hinges commonly called butt-hinges, whereby the leaves of the hinge, and consequently the door, shutter, or gate to which they are applied, are acted upon by a spring that is inclosed within the eyes of the hinge, and the spring is capable of being adjusted so as to act with greater or less force upon the leaves, either to keep them open or closed by its recoil. The hinge is so constructed, with a view to these ojects, that the adjustments may be effected with the hinge attached to a door, gate, or shutter with very little labor or loss of time, and without danger of the displacement or dislocation of the parts of the hinge with reference to each other, while, at the same time, the parts can be made durable, and not liable to get deranged under very hard usage.

Butt-hinges provided with more or less of the following parts, viz., eyes somewhat larger than are used on ordinary hinges, having a sleeve-joint to keep them in their proper relation, a coiled spring introduced therein, each end of which is secured permanently to a cap, and a center rod riveted or otherwise secured at each end and holding all the parts together, were known previous to the date of my invention. As previously made, they could not, except, possibly, in the case of the invention of J. S. Smith, patented May 19, 1857, No. 17,354, where perhaps, it may be done with difficulty, be adjusted while attached to a door and in use; nor could they be adjusted in any case by the immediate and sole instrumentality of an adjustable cap, without disturbing the pintle, operating directly upon the spring and directly attachable to one leaf of the hinge by a detent. In my invention a fixed cap, provided with a lug projecting into the coil of the spring, interlocks with the eye of one leaf of the hinge at the bottom, and into it one end of the spring is inserted. At the top I place an adjustable cap, in which one end of the spring takes. It is free to move horizontally, but not vertically, in the act of adjustment, or in a plane parallel to that in which the eyes of the hinge turn—while it is detained and held attached to the spring, and capable of detent attachment to the hinge when adjusted. This cap has holes on its upper sides for the adjusting-lever, a wrench-seat or an octagonal or nut form below to receive a detent-ring of corresponding form provided with an arm made V-shaped, to engage a corresponding part of the leaf; and it also has a lug projecting down inside the spring to support it. A rod or pintle passes through both caps and the axis of the spring. It is screwed into the lower cap, but has an enlarged or conical head seated in the cap, which detains while permitting independent rotary motion of the upper cap in a horizontal plane, the pintle itself remaining stationary.

To enable others skilled in the art to fully understand my invention, I will proceed to describe its construction and operation.

In the drawings, A A′ represent the leaves of the hinge, and B B′ are the eyes of the same, cast quite large in diameter, with male and female portions on their abutting ends, as shown in Fig. 1, which serve to keep their ends in their proper place during the movements of the portions A B. The bore of the tubular eyes B B′ is made of sufficient diameter to admit a strong helical spring, C, the ends of the wire of which are bent out straight and pass into holes in the top and bottom caps or portions D E, respectively, and connect the spring C with each of these portions D E. The cap D is cast with a short neck and two lugs, *a a*, which latter fit into corresponding recesses cast in the bottom of the eye B′, and prevents the cap D, and consequently the spring C, from turning at this point. The top portion E is intended to turn, it being furnished only with a short neck that fits into the end of eye B, for the purpose of keeping it steady and in place on the eye. This upper cap E is cast with a nut-shaped part, and a cylindrical head above it that is perforated, for the purpose hereinafter to be described, and over this head, and on the nut portion, fits a ring, G, (shown in Figs. 1 and 5,) from the periphery of which a projection, *g*, with a V-groove cut vertically in it, extends, as clearly represented in Fig. 5, into which fits a V-shaped tenon, *h*, that projects up from the top of the leaf. The spring is attached to the cap E, which is itself attached to the swinging leaf B by the removable ring G. H is the pintle that passes down through the center of cap E, through the helical spring C, and screws into the cap D, and secures the two parts A A′ together, and the caps D E to the top and bottom of the eyes. J J are lugs that project respectively from the inner ends of the two caps D E a suitable distance into the ends of the spring C, and they serve a very important purpose, in that they give increased stiffness to the entire spring by preventing the ends from collapsing, and by distributing the applied power over its whole length. The use of these lugs is, therefore, deemed very important, as it is desirable to have the eyes of the hinge as small in diameter as possible.

From this description it will be seen that, by removing the ring-piece G or detaching it from the leaf A, the hinge will move freely, and operate like any ordinary hinge, the bearing being upon the necks of the caps D E. Now, by introducing into one of the perforations in the cylindrical portion of the cap E a pin which will serve for a lever, and turning it round as many times as may be desired, thus winding up the spring C, and, while the spring is held in this state, dropping the ring G on the nut and passing the tenon *h* into the V-groove, a lock will be formed between the spring and swinging leaf of the hinge, and the spring may thus be made to act directly on this leaf to close the door, gate, or shutter to which the hinges may be applied. Then, by raising the ring G from the nut portion and reversing the movement of the cap E, and then dropping the ring in place again, the spring may be made to operate to keep the door in an open state; or, by disengaging the V-groove from its tenon, it will be seen that the door will swing open or shut as freely as with the ordinary butt-hinge. The top end of the eye B is made to receive a portion of the ring G, so that said ring will rest snugly and keep in its proper place when in use. The nut or cap E is octagonal in part, and the inside of the ring is made to fit this angular portion. Thus, at every eighth turn of the cap E the ring may be set in place, giving a gradually-increased force of the spring upon the leaf A, and enabling any one to increase or diminish this force at pleasure, with great facility, and while the hinges are in use, and applied to a door, gate, or anything else.

I claim as my invention—

1. The adjustable cap E, arranged to turn, during adjustment, in a horizontal plane without vertical movement, and independent of the pintle, in combination with the spring C.

2. The projecting lugs on the caps D and E, in combination with a coiled spring, as and for the purpose set forth.

3. The combination of the adjustable cap E, having horizontal without vertical movement in the act of adjustment, and the engaged spring C, with the tubular eyes B B′ of the hinge-leaves A A′, the fixed cap D, the locking-ring G, or any equivalent detent devices, and a retaining-pintle.

ABRAM ACKER.

Witnesses:

JAMES A. SKILTON,
W. J. VAN ARSDALE.